(12) United States Patent
Singh (10) Patent No.: US 12,124,473 B2
(45) Date of Patent: Oct. 22, 2024

(54) SYSTEMS AND METHODS FOR GENERATING CHARTS, EXTRACTING DATA, AND EXECUTING COMMANDS IN REPORTS

(71) Applicant: Honeywell International Inc., Charlotte, NC (US)

(72) Inventor: Ankit Singh, Apex, NC (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/069,997

(22) Filed: Dec. 21, 2022

(65) Prior Publication Data

US 2024/0211485 A1    Jun. 27, 2024

(51) Int. Cl.
| G06F 16/00 | (2019.01) |
| G06F 16/245 | (2019.01) |
| G06F 16/248 | (2019.01) |
| G06F 16/26 | (2019.01) |

(52) U.S. Cl.
CPC ............ *G06F 16/26* (2019.01); *G06F 16/245* (2019.01); *G06F 16/248* (2019.01)

(58) Field of Classification Search
None
See application file for complete search history.

(56) References Cited

U.S. PATENT DOCUMENTS

| 10,970,298 | B1 * | 4/2021 | Madheswaran | ......... H04L 41/22 |
| 11,644,955 | B1 * | 5/2023 | Singamneni | .......... G06F 3/0481 |
| | | | | 707/722 |
| 2015/0170382 | A1 * | 6/2015 | Bhatia | .................... G06Q 40/00 |
| | | | | 345/440 |
| 2016/0328418 | A1 * | 11/2016 | Shimazawa | ............. G06F 16/29 |
| 2017/0052652 | A1 * | 2/2017 | Denton | ................... G06Q 50/01 |
| 2018/0173372 | A1 * | 6/2018 | Greenspan | .......... G06F 16/2465 |
| 2018/0232918 | A1 * | 8/2018 | Ni | ........................... G06F 16/29 |
| 2020/0012638 | A1 * | 1/2020 | Luo | ....................... G06F 16/248 |
| 2020/0401762 | A1 * | 12/2020 | Rychlewski | ............ G06F 16/34 |
| 2021/0019309 | A1 * | 1/2021 | Yadav | ................. G06F 16/2428 |
| 2021/0224275 | A1 * | 7/2021 | Maheshwari | .......... G06N 3/044 |
| 2021/0303238 | A1 * | 9/2021 | Minamiyama | ....... B41J 2/17543 |
| 2021/0303591 | A1 * | 9/2021 | Fleming | ................... G06T 19/00 |
| 2021/0342545 | A1 * | 11/2021 | Avshalomov | ......... G06F 16/248 |
| 2022/0222604 | A1 * | 7/2022 | Schilz | .................... G06N 20/00 |

* cited by examiner

*Primary Examiner* — Hasanul Mobin (74) *Attorney, Agent, or Firm* — Alston & Bird LLP (57) ABSTRACT

A computer-implemented method for dynamically modifying at least one visualization, the method comprising: receiving data from at least one database, receiving configuration data from at least one user, based on the received data, generating at least one report that includes at least one visualization based on the received data and the configuration data, receiving at least one annotation from at least one additional user, the at least one annotation including one or more tokens, transmitting at least one search query to the at least one database, the at least one search query including at least one of the one or more tokens, in response to transmitting the at least one search query, receiving updated visualization data from the at least one database, and displaying the updated visualization on one or more user interfaces of one or more user devices.

20 Claims, 5 Drawing Sheets

SYSTEMS AND METHODS FOR GENERATING CHARTS, EXTRACTING DATA, AND EXECUTING COMMANDS IN REPORTS

TECHNICAL FIELD

The present disclosure relates generally to systems and methods for dynamically modifying at least one visualization of a report and more specifically, to systems and methods for dynamically modifying at least one visualization based on a user's role.

BACKGROUND

Pharmaceutical companies and other companies can be subject to in-depth internal and external reviews of their practices and products. One way for companies to prepare for in-depth external reviews is by carefully conducting annual product and process reports. For example, companies may generate one or more annual product reports and/or annual product quality reviews (APQR). Such reports may be internal to a firm and may be based on data from numerous distinct data sources (e.g., databases) with disparate formatting, terminology, metadata, etc. Since the reports may be generated from many different and dissimilar sources, and since the final report generated from the review may be subject to careful, multi-level review before its publishing, the generation and approval of such reviews/reports may take months, if not years, expending countless hours. As a result, such painstaking aggregation, review, comment, correction, and approval consume valuable resources that could be more profitably expended elsewhere. Accordingly, automated systems for the generation and modification of reports are required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method for dynamically modifying at least one visualization is disclosed, the method comprising: receiving, by one or more processors, data from at least one database; receiving, by the one or more processors, configuration data from at least one user; based on the received data, generating, by the one or more processors, at least one report, wherein the at least one report includes at least one visualization based on the received data and the configuration data; receiving, by the one or more processors, at least one annotation from at least one additional user, the at least one annotation including one or more tokens; transmitting, by the one or more processors, at least one search query to the at least one database, the at least one search query including at least one of the one or more tokens; in response to transmitting the at least one search query, receiving, by the one or more processors, updated visualization data from the at least one database; and displaying, by the one or more processors, the updated visualization on one or more user interfaces of one or more user devices.

In another embodiment, a computer system for dynamically modifying at least one visualization is disclosed, the computer system comprising: a memory having processor-readable instructions stored therein; and one or more processors configured to access the memory and execute the processor-readable instructions, which when executed by the one or more processors configures the one or more processors to perform a plurality of functions, including functions for: receiving data from at least one database; receiving configuration data from at least one user; based on the received data, generating at least one report, wherein the at least one report includes at least one visualization based on the received data and the configuration data; receiving at least one annotation from at least one additional user, the at least one annotation including one or more tokens; transmitting at least one search query to at least one database, the at least one search query including at least one of the one or more tokens; in response to transmitting the at least one search query, receiving updated visualization data from the at least one database; and displaying the updated visualization on one or more user interfaces of one or more user devices.

In yet another embodiment, a non-transitory computer-readable medium containing instructions for dynamically modifying at least one visualization is disclosed, the instructions comprising: receiving data from at least one database; receiving configuration data from at least one user; based on the received data, generating at least one report, wherein the at least one report includes at least one visualization based on the received data and the configuration data; receiving at least one annotation from at least one additional user, the at least one annotation including one or more tokens; transmitting at least one search query to at least one database, the at least one search query including at least one of the one or more tokens; in response to transmitting the at least one search query, receiving updated visualization data from the at least one database; and displaying the updated visualization on one or more user interfaces of one or more user devices.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

According to certain aspects of the disclosure, methods and systems are disclosed for dynamically modifying at least one visualization of a report. Conventional techniques may not be suitable at least because conventional techniques, among other things, do not allow for the ability to dynamically modify visualizations of a report. Additionally, conventional techniques may not provide the ability to automatically determine the data sources that include data for such visualizations. Accordingly, improvements in technology relating to dynamically modifying visualizations of a report are needed.

Pharmaceutical companies and other companies can be subject to in-depth internal and external reviews of their practices and products. One way for companies to prepare for in-depth external reviews is by carefully conducting annual product and process reports. For example, companies may generate one or more annual product reports and/or annual product quality reviews (APQR). Such reports may be internal to a firm and may be based on data from numerous distinct data sources (e.g., databases) with disparate formatting, terminology, metadata, etc. Since the reports may be generated from many different and dissimilar sources, and since the final report generated from the report may be subject to careful, multi-level review before its publishing, the generation and approval of such reviews/reports may take months, if not years, expending countless hours. As a result, such painstaking aggregation, review, comment, correction, and approval consume valuable resources that could be more profitably expended elsewhere. Accordingly, there is a demand for automated systems for the generation and modification of reviews.

Additionally, there are a lot of manual steps in the configuration process to generate the content of the report. For example, each section of the report may include charts and/or tables (e.g., visualizations) to display the report data. The configuration may be performed by a customer administrator who may not necessarily understand the context of the various sections of the report and may misconfigure the report. If there is a misconfiguration and the charts and/or tables are incorrectly generated, there may be back and forth communication between a department user and the customer administrator to fix the configuration, which may be incredibly time consuming. Similarly, when there are comments/annotations regarding the content of the report, the department user typically communicates the information back to the configurator to configure the system correctly, which adds additional time to the overall process. Accordingly, there is a demand to streamline the role of the customer administrator.

Advantages of such a system may include increasing efficiency, as allowing for the dynamic creation, modification, and/or removal of visualizations may reduce the manual workload of users. For example, such a dynamic system may remove the need for a user to manually determine the data sources for such visualizations. Instead, the automated system may interact with internal and/or external systems that may store the data needed for the visualizations. Based on such interactions, the automated system may determine which internal and/or external systems store data needed for the visualizations, as well as retrieve the data in order to create or modify the visualizations. Other advantages may include bypassing the configuration for the sections of the report, where the configuration may be derived by free text input by one or more users.

The systems and methods disclosed herein relate to dynamically modifying at least one visualization. The systems and methods may include receiving, by one or more processors, data from at least one database in communication with a plurality of external databases. The systems and methods may further include receiving, by the one or more processors, configuration data from at least one user with a business administrator role. The systems and methods may further include, based on the received data, generating, by the one or more processors, at least one report that includes one or more sections that each correspond to at least one user role, wherein at least one of the one or more sections includes at least one visualization based on the received data and the configuration data. The systems and methods may further include receiving, by the one or more processors, at least one annotation corresponding to at least one of the one or more sections from at least one additional user, the at least one annotation including one or more tokens. The systems and methods may further include analyzing, by the one or more processors, the at least one user role corresponding to the at least one additional user to determine whether the at least one additional user has permission to modify the at least one of the one or more sections. The systems and methods may further include, in response to determining that the at least one additional user has permission to modify the at least one of the one or more sections, transmitting, by the one or more processors, at least one search query to the at least one database, the at least one search query including at least one of the one or more tokens, wherein the at least one database transmits at least one external search query to the plurality of external databases. The systems and methods may further include, in response to transmitting the at least one search query, receiving, by the one or more processors, updated visualization data from the at least one database. The systems and methods may further include generating, by the one or more processors, an updated visualization based on the at least one visualization and the updated visualization data. The systems and methods may further include displaying, by the one or more processors, the updated visualization on one or more user interfaces of one or more user devices.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments may be used for the described systems and methods. For example, other embodiments may include electronic signatures, approval from agencies, such as the FDA, and the like.

Exemplary Environment

Figure 1:
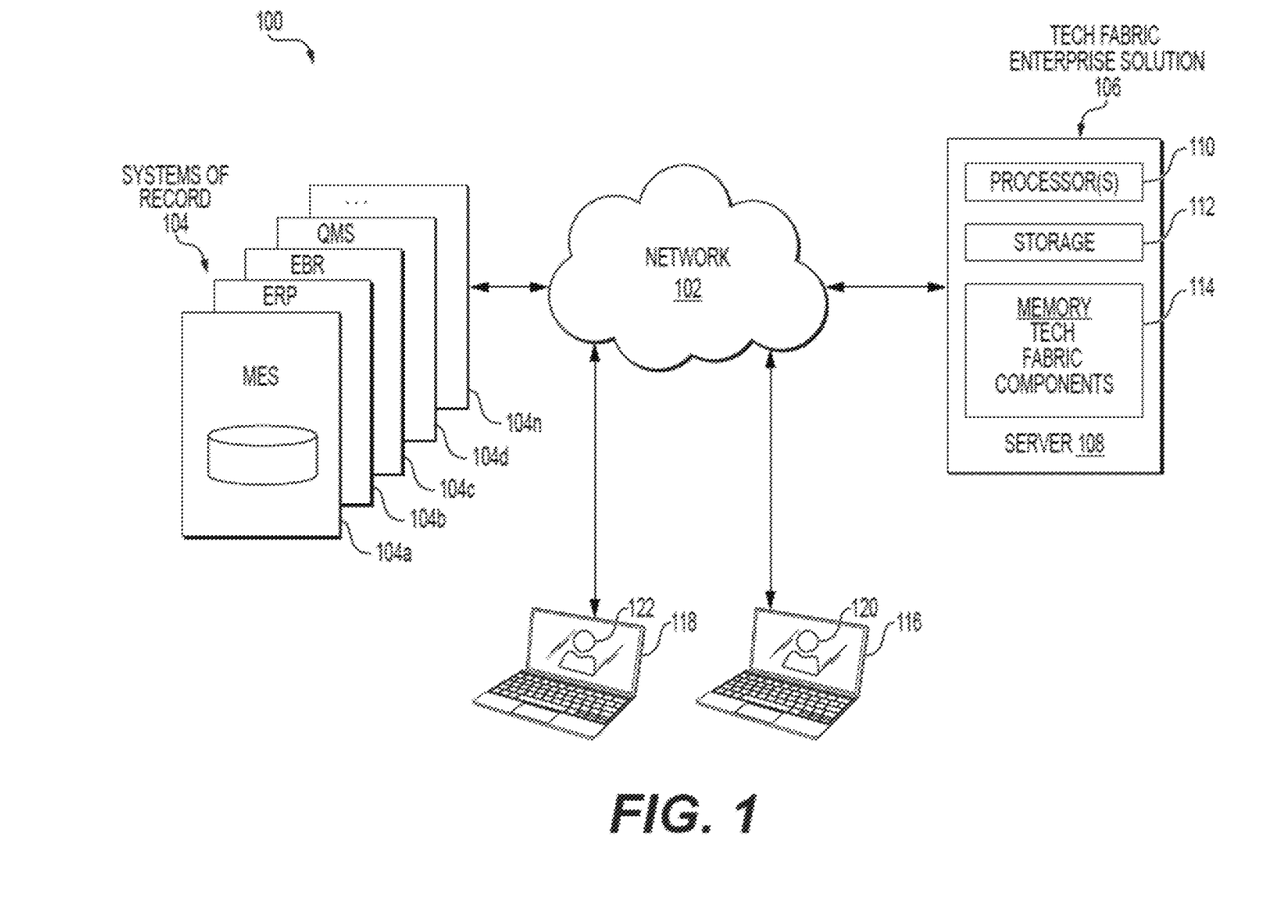
FIG. 1 depicts an exemplary computing environment for integrating data from various systems of record to generate a final product, according to one or more embodiments.

FIG. 1 depicts an exemplary computing environment 100 including a network 102 configured to communicatively connect one or more systems of record (SOR) 104 to a tech fabric enterprise solution 106. The tech fabric enterprise solution 106 may provide data from the systems of record 104 for analysis in an annual product quality review (APQR) using the tech fabric enterprise solution 106. The computing environment 100 or portions thereof, including the network 102, can be any type of communication network, including, for example, a wireless local area network (WLAN), a cloud network, the Internet, etc.

The SOR 104 may include, for example, a manufacturing execution system (MES) 104a, an enterprise resource planning (ERP) system 104b, an electronic batch record (EBR) 104c, a quality management system (QMS) 104d, and/or one or more additional systems of record. The SOR 104 may represent available data sources that include relational data repositories and operational data stores, which may include structured and unstructured data (e.g., collections of files, documents, sheets, etc.). In some embodiments, the SOR 104 may include and/or be configured to provide real time data. The SOR 104 may be implemented, for example, on a computer system running a database management system and may serve as an authoritative source of data for a given data element (or other piece of information) within that computer system and for other computers or computer networks communicating with that computer system (e.g., the network 102). Accordingly, if different systems or computers within the network 102 disagree about a given piece of information, the data contained within the SOR 104 may control. Disagreements could stem from, for example, semantic differences, uses of different resources in different ways at different times, differences in timing, extraction, transformation, loading, and other processes that create and/or manipulate data that the various computers and systems on the network 102 report against. In some cases, differences in data may be the result of one or more inconsistencies or bugs within the various components of the system. Hence, the SOR 104 may serve as a valid data source when there is no valid, traceable source.

Examples of information stored in the SOR 104 may include information related to, for example, customer services, sales, procurement, production, distribution, accounting, human resources, corporate performance, and the like.

In some embodiments, the tech fabric enterprise solution 106 may be implemented by a computer system which may include, for example, a server 108. The server 108 may include one or more processors 110, storage 112, and/or a memory 114 that may include the components of the tech fabric 106, shown in greater detail in FIG. 2. The applications of the tech fabric 106 may be implemented, for example, by the one or more processors 110. The computer system may include any type of computing device(s), including any type of server systems (e.g., virtualized, stand-alone, etc.). The computer system may be operated using an operating system (OS), for example, Windows, Linux, UNIX, etc. The processor 110 may be a single or multiple microprocessors. The memory 114 may be a random access memory and may comprise one or more memory modules. The storage 112 may be any type of storage device including disc storage, solid state storage device, etc.

The network 102 may be accessed using, for example, a computing device 116 and/or a computing device 118. Such devices may be configured to grant access to the network 102 to one or more users with different roles, for example, a systems administrator 120 and/or a business administrator 122. The systems administrator 120 may have access to certain aspects of the tech fabric administration, such as the systems of record integrations and mappings from the systems of record raw data fields to various enterprise object models. The business administrator 122 may have configuration responsibilities for various other aspects within one or more final reports generated using the tech fabric enterprise solution 106.

Exemplary Tech Fabric

Figure 2:
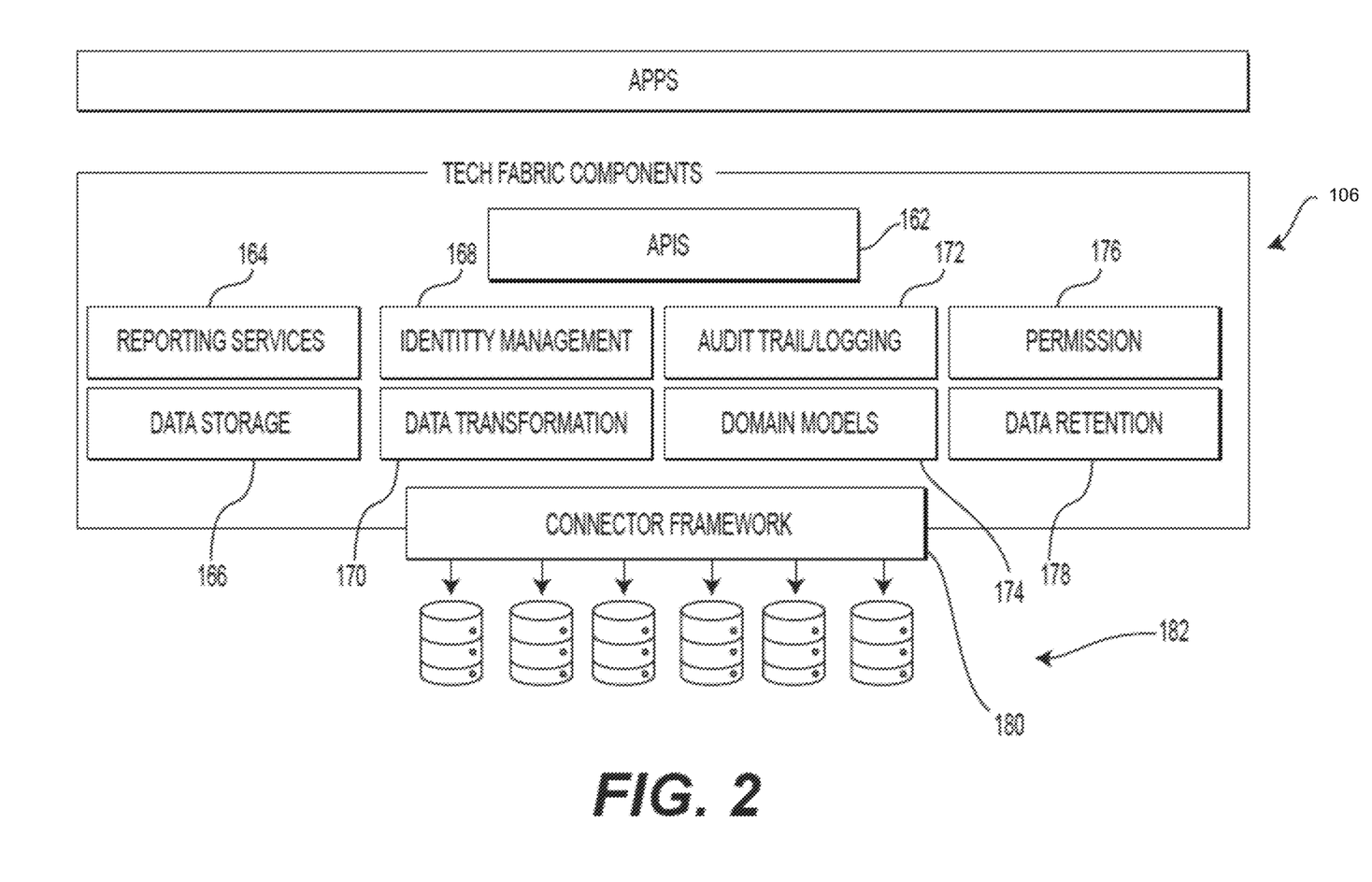
FIG. 2 depicts an exemplary tech fabric enterprise component, according to one or more embodiments.

FIG. 2 depicts an exemplary tech fabric enterprise component 106. The tech fabric enterprise component 106 may include an API module 162, a reporting services module 164, a data storage module 166, an identity management module 168, a data transformation module 170, an audit trail/logging module 172, a domain models module 174, a permissions module 176, and/or a data retention module 178. The various modules may provide data to a connector framework 180 for sending the processed data to one or more databases 182.

The APIs module 162 may provide one or more users (e.g., the systems administrator 120, the business administrator 122, etc.) and/or developers with one or more tools (e.g., wizards, UIs, etc.) to design, test, implement, deploy, and manage APIs for use across the environment 100. A user can create one or more intermediaries (e.g., software applications) that may make it possible to read, convert, present, use, manipulate, or otherwise access the data on the SOR 104 for presentation or other use in a generated product. The APIs module 162 may be cloud-based or locally accessible by one or more users (e.g., the systems administrator 120, the business administrator 122, etc.).

The APIs module 162 may be used to allow one or more programs and/or computer systems within the network 102 to communicate with one another. In some embodiments, the APIs module 162 may include an API specification, which may describe how to build and/or use one or more of the APIs built using the API module 162 within the network 102. The APIs module 162 may include one or more subroutines, methods, requests, or endpoints that may be tools used to program the one or more APIs. The APIs module 162 may be used to generate one or more APIs for specific reports.

In some embodiments, the APIs module 162 may be used to build one or more web APIs, which may allow communication between one or more computers or computer systems that may connect the network 102 with another external network (e.g., the Internet). In some embodiments, the web APIs may allow access to one or more computers or computer systems communicatively coupled to the network 102 through one or more client devices (E.g., mobile phones, laptops, etc.). Such devices may connect to the network using, for example, the hypertext transfer protocol (HTTP). These client devices may send a request in the form of an HTTP request. The request may be met with a response message in a different format (e.g., JavaScript Object Notation (JSON), and/or extensible markup language (XML), etc.) In some embodiments, one or more users may use a web API (e.g., a web API created by the APIs module 162) to query the one or more SOR 104 for a specific set of data.

The reporting services module 164 may aggregate usage information for various aspects (e.g., files, data, etc.) and may report the usage information to one or more of the various interconnected systems or modules (e.g., the APIs module 162, the network 102, etc.). For example, if a particular file or data is accessed and/or used, the reporting services module 164 may aggregate data regarding the use of that particular information and report it to one or more internal modules or external systems. The reporting services module 164 may further generate information regarding, for example, statistical information on the amount of usage of the tech fabric enterprise solution 106 or other components of the system 100.

The data storage module 166 may include one or more storage drives configured to retrieve stored data in response to one or more storage commands received from the system 100 (e.g., from the system admin 120). The data storage module 166 may include hardware and software components, for example, the data storage module 166 may include a plurality of storage drives (e.g., solid state drives) that may be configured to store and retrieve data in response to storage instructions. Portions of the storage module 166 may be implemented using software modules, such as drivers, services, and/or the like. Other portions of the storage module 166 may be implemented using hardware resources, such as FPGAs, processors, ASICS, hardware controllers, storage controllers, and the like.

The identity management module 168 may provide identity services, such as access management and authorization services, to the tech fabric enterprise component 106. The identify management module 168 may control information about tenants and clients that may utilize the services provided by tech fabric enterprise component 106. Information used and generated by the identity management module 168 may include authenticating information that identifies users and assigns the users appropriate authorizations for particular system resources. In some embodiments, the identity management module 169 may include a framework of policies and technologies that may safeguard the network 102 such that the correct users (e.g., that are part of the ecosystem connected to the network 102) have the appropriate access to the appropriate resources. The identity management module 168 may enable users to create and/or gain an identity within the ecosystem, assign the created/gained users or other users one or more roles within the ecosystem, and may assign permissions and/or identity grants to the users. The identity management module 169 may store and make available the identities and the technologies supporting that protection (e.g., network protocols, digital certificates, passwords, etc.).

The identity management module 168 may serve various functions throughout multiple stages of a user's interaction with the network 102. For example, during a registration phase, the identity management module 168 may register and authorize access rights. During an operations phase, the identity management module 168 may continuously identify, authenticate, and control the individual identities and/or groups of identities with access to the various hardware and/or software systems of the network 102. The identity management module 168 may serve, for example, five basic functions: pure identity, user access (e.g., log-on), presence-based services, identity federation, and audit function. In some embodiments, the identity management module 168 may be communicatively coupled with one or more external identity management systems that may perform one or more of the functions of the identity management module 168.

The data transformation module 170 may be configured to transform, convert, and/or translate data acquired from the SOR 104 for use by the tech fabric enterprise component 106. The transformation module 170 may be configured to parse data structures acquired from the SOR 104 and to transform the data into a format that is compatible for use with one or more other components of the system 100 (e.g., one or more other modules or for storage in a database). The tech fabric enterprise component 106 may comprise multiple data transformation modules 170, where each module may be configured to transform data from one or more of the individual SORs 104a, 104b, etc. The data transformation module 170 can receive a user query and retrieve and transform unstructured or structured data.

The audit trail/logging module 172 may be configured to track, in real time, a request for identity verification and any response from any of the various users of the system 100. In some embodiments, the audit trail/logging module 172 may be configured to track or monitor services performed by various users of the system and by the various components of the system (e.g., one or more servers). The audit trail/logging module 172 may be configured to record a detailed log of actions and events which occur within the system 100. As a result, the system administrator 120 or other user may identify and locate sources of error.

The domain models module 174 may store one or more data relationships associated with a particular industry for which the final product of the process may be generated. For example, the domain model module may store one or more data relationships in a term list associated with the life sciences industry. These domain models may be used to determine key words of interest or other information with respect to a particular final product. One or more storage devices (e.g., the raw data storage 130) may store a corpus, n-gram index, semantic graph, domain model, or other data used for automatic domain model generation.

The permissions module 176 may be configured to determine whether a user is authorized to access certain information and/or to perform a particular action within the system 100. The permissions module 176 may query permissions data stored in the system 100. The stored data may indicate required permissions associated with various actions or settings. Users may have varying levels of permission based on different actions/information. The permissions module 176 may access and analyze identity information for particular users to determine an identity of a user. For example, the permissions module 176 may determine permissions of a user based at least in part on the identity of the user.

The data retention module 178 may be configured to detect a data retention triggering event and to initiate one or more data retention. For example, data may be retained in the memory 114 using one or more sets of write parameter values. In some embodiments, the data retention module 178 may be configured to delete all stored data in response to a triggering event. For example, all of a client's stored data may be deleted upon completion and delivery of an APQR. The data retention module 178 may be configured to initiate an autonomous storage operation or to create sufficient storage space for a particular operation. For example, the data retention module 178 may cause data from the SOR 104 to be stored in a local module within the tech fabric 106 for later processing and manipulation (e.g., during report generation).

The connector framework 180 may be, for example, an object oriented framework that may facilitate communication between one or more application components (e.g., APIs) running in the tech fabric enterprise component 106 and the one or more SOR 104. The connector framework 180 may include one or more protocol definitions for implementation by one or more connector components, where the connector components may enable communication between the tech fabric 106 and the SOR 104.

Exemplary Process for Updating a Visualization

Figure 3:
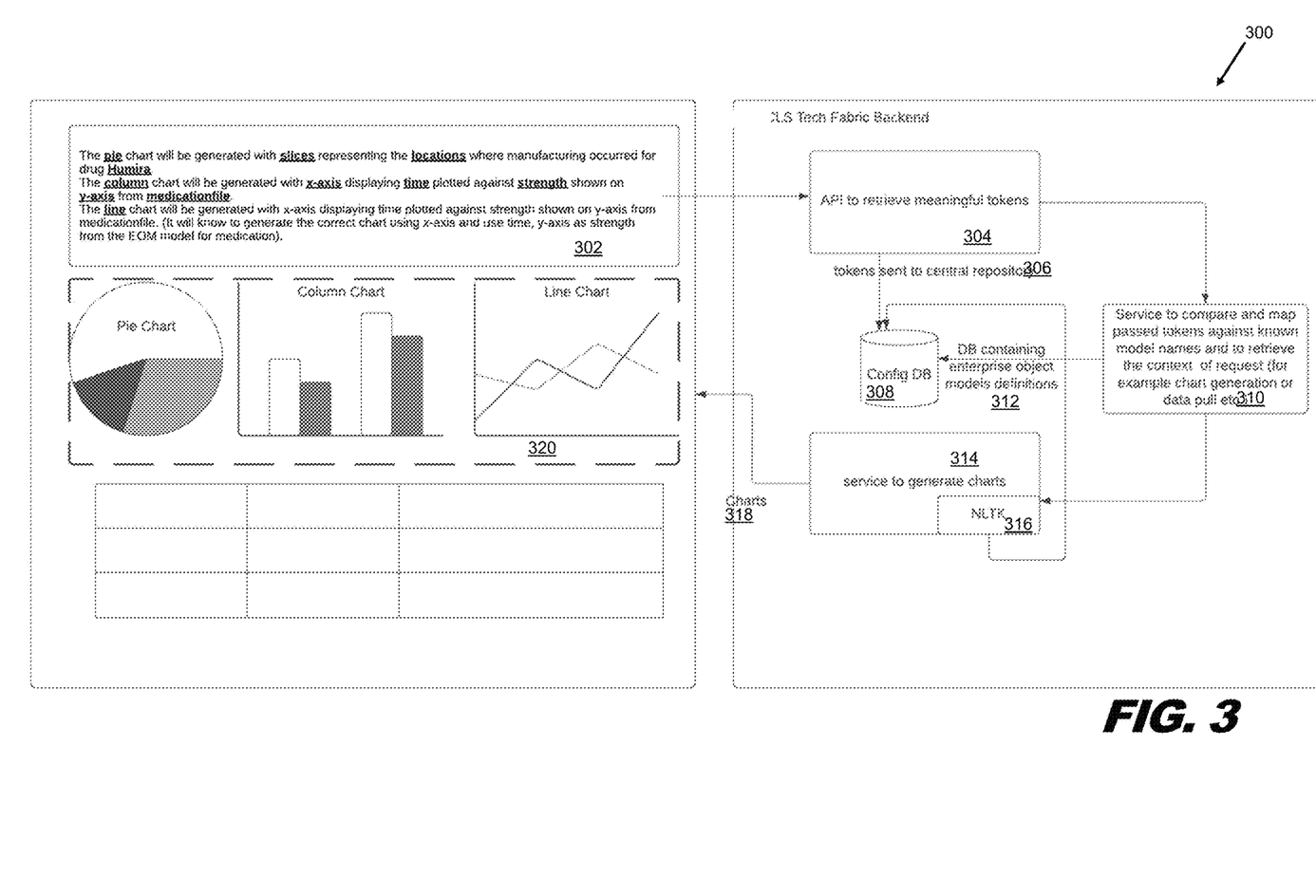
FIG. 3 depicts an exemplary process for updating a visualization, according to one or more embodiments.

FIG. 3 illustrates an exemplary process 300 for updating a visualization, according to one or more embodiments.

Notably, process 300 may be performed by one or more processors of a server that is in communication with one or more user devices and other external system(s) via a network. However, it should be noted that process 300 may be performed by any one or more of the server, one or more user devices, or other external systems. Exemplary process 300 may be executed on one or more components of FIGS. 1-2.

The process may include receiving one or more annotations that correspond to at least one section of a report (Step 302). The annotations may have been input by a user. For example, the user may login to an application on a device to input the annotations. The annotations may correspond to one or more charts and/or tables for a section of a report (e.g., a SaaS report viewer). Additionally, the annotations may include one or more tokens. The report may correspond to a review report that focuses on product quality. For example, the report may correspond to an Annual Product Quality Review report for one or more medications.

The process may also include utilizing one or more APIs to retrieve meaningful tokens (Step 304). For example, as shown in FIG. 3, the meaningful tokens may include "pie," "slices," "locations," "Humira," "column," "x-axis," "time," "strength," "y-axis," "medicationfile," and "line," which may be extracted from the annotations.

The process may also include sending the one or more tokens to a central repository for storage (Step 306). For example, the one or more tokens may be sent to, and saved in, a configuration database (e.g., config db 308). The tokens may be saved with a unique identifier that is associated with the report. The configuration database may include a list of defined configuration models. The configuration models may include configuration data that defines the contents of a report. For example, the configuration data may define one or more sections of the report, as well as data sources to retrieve the data of the report.

The process may also include utilizing a service to compare and map the tokens against known model names, as well as retrieve the context of the request (e.g., chart generation, data pull, and the like) (Step 310). The comparing and mapping may further include communicating with one or more databases that contain enterprise object models definitions (Step 312). For example, the databases may receive requests for enterprise object models definitions that correspond to the tokens. The mapping may include mapping a token against similar token values stored in the databases. The mapping may include a predefined relationship between the token and the similar token values.

The comparing and mapping may further include communicating with a service to generate one or more charts (e.g., service to generate charts 314). In some embodiments, the service to generate charts 314 may include a Natural Language Toolkit ("NLTK") (e.g., NLTK 316). The NLTK may be in communication communicate with the configuration database. Additionally, or alternatively, the service to generate charts 314 may generate and output one or more charts (e.g., charts 318). For example, the NLTK may be applied to free text sections of the reports to re-pull the correct time range data or regenerate the charts and tabular contents, as well as make changes in the views of the data based on command parsing. The one or more charts may include a pie chart, a column chart, and/or a line chart (Step 320).

For example, in an embodiment, a user with a department role may log in to the system and bypass the configuration of the system. The user may start entering free text (annotations) for a section of a report. For example, the user may input information regarding the type of charts and/or types of tables that should be included in a section of the report. The user may also specify the columns for the charts and/or tables, the date range for the charts and/or tables, which system(s) to pull the data for the charts and/or tables, the x-axis values for the charts, the y-axis for the charts, column combinations, aggregations, and the like. The annotations may then be submitting to the system for processing. Upon receiving the annotations, the system may parse the annotations for tokens, as well as split each sentence into a specific request. The meaningful tokens may then be extracted and mapped against known model definitions. Additionally, or alternatively, the system may create a configuration model based on the annotations, generate the output of such annotations, and display such output on one or more user interfaces.

Although FIG. 3 shows example blocks of exemplary process 300, in some implementations, the exemplary process 300 may include additional blocks, fewer blocks, different blocks, or differently arranged blocks than those depicted in FIG. 3 Additionally, or alternatively, two or more of the blocks of the exemplary process 300 may be performed in parallel.

Exemplary Method for Dynamically Modifying a Visualization

Figure 4:
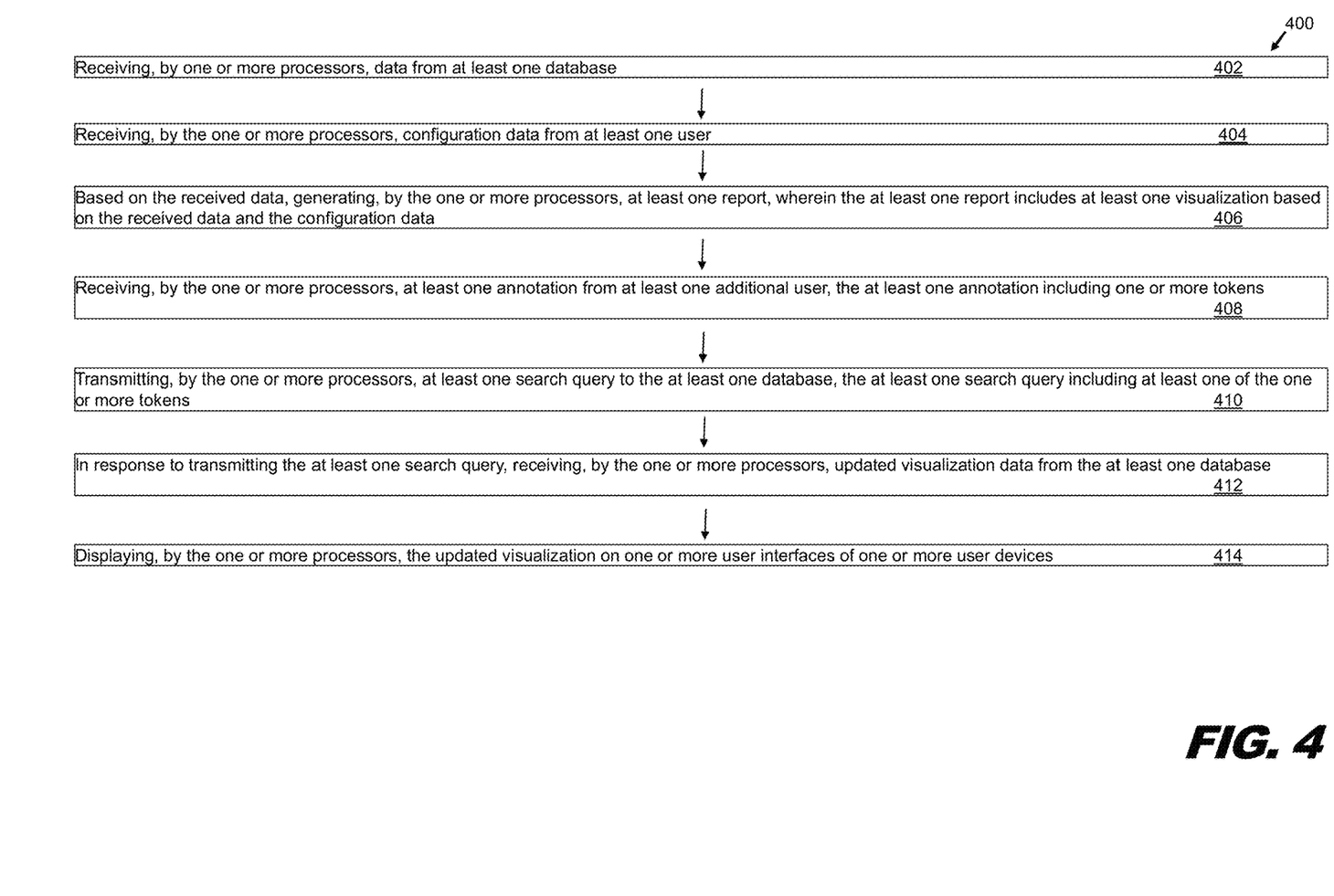
FIG. 4 depicts a flowchart of an exemplary method for dynamically modifying at least one visualization, according to one or more embodiments.

FIG. 4 illustrates an exemplary method 400 for dynamically modifying at least one visualization, according to one or more embodiments. Notably, process 400 may be performed by one or more processors of a server that is in communication with one or more user devices and other external system(s) via a network. However, it should be noted that process 400 may be performed by any one or more of the server, one or more user devices, or other external systems. Exemplary process 400 may be executed on one or more components of FIGS. 1-3.

The method may include receiving, by one or more processors, data from at least one database (Step 402). In some embodiments, the at least one database may be in communication with a plurality of external databases. For example, the at least one database may include one or more data lakes. Additionally, the plurality of external databases may correspond to one or more external systems. Each of the external systems may collect and/or store information corresponding to medication, medical information, patient information, and the like. For example, medication information may be collected using different forms and/or reference terminology. Additionally, each of the external systems may collect medication information in different forms, reference terminology, data structures, and the like. The database (e.g., a data lake) may communicate with the plurality of external databases and store some or all of the information included in each of the plurality of external databases.

The method may include receiving, by the one or more processors, configuration data from at least one user (Step 404). The configuration data may include one or more specifics corresponding to a report. In some embodiments, the at least one user may have a business administrator role. The report may correspond to a review report that focuses on product quality. For example, the report may correspond to an Annual Product Quality Review report of one or more medications. Additionally, each report may include one or more sections. The configuration data may configure the one or more sections of the report so that the correct data is retrieved and correct visualizations are generated. In some embodiments, some of the configurations for the sections may be derived from a text area of the report (e.g., the text entered by a user with a department role, when such user accesses a particular section of the report). Example configuration data may include the number of sections in the report, user roles corresponding to each section, content specifics for each section, one or more visualizations for each section, visualization specifics corresponding to each section, and the like. Additionally, the visualization specifics may include a visualization type (e.g., bar chart, pie chart, and line chart), x-axis (e.g., time value), y-axis (e.g., medication strength), one or more enterprise object model definitions, and a visualization source (e.g., one or more specific files). The business administrator role may correspond to a user who may provide configuration data that further describes details/specifics of the report. The user may input the configuration data via one or more interfaces of one or more devices.

The method may include, based on the received data, generating, by the one or more processors, at least one report, wherein the at least one report includes at least one visualization based on the received data and the configuration data (Step 406). In some embodiments, the at least one report may include one or more sections that each correspond to at least one user role. Additionally, at least one of the one or more sections may include the at least one visualization. The generating may include creating the report using the received data and configuration data. The generating may further include providing the report to one or more user devices. For example, the report may be displayed on the one or more user devices. Additionally, the generating may include storing the report in the at least one database. The at least one user role may include at least one of a fabric administrator role, the business administrator role, a department role, a quality role, or an approval role. The fabric administrator role may correspond to a user who may interact with a data center that may include the database. The business administrator role may correspond to a user who may provide configuration data that further describes details/specifics of the report. The department role may correspond to a user who may provide some additional analysis regarding one or more sections of the report. Additionally, for example, the department role may correspond to a user who may be responsible for only once section of the report. For example, a user with a department role may modify, create, or remove content from a section of the report. The quality role may correspond to a user who may be responsible for ensuring the quality and accuracy of the report. For example, a user with a quality role may re-run the report. The approval role may correspond to a user who may be responsible for approving the content, procedures, and/or products described in the report. For example, a user with an approval role may correspond to someone who is a part of the U.S. Food and Drug Administration (FDA), where the report may describe a particular medication.

The method may include receiving, by the one or more processors, at least one annotation from at least one additional user, the at least one annotation including one or more tokens (Step 408). In some embodiments, the at least one annotation may correspond to at least one of the one or more sections of the report. The at least one annotation may include text input by the additional user, where the text may correspond to a section of the report. Additionally, for example, the annotation may correspond to updates and/or the creation of at least one visualization. The text may have been input via one or more interfaces of one or more devices by the additional user. In some embodiments, the tokens may have been pre-defined. At least one of the one or more tokens may indicate information about a visualization type, a visualization time period, a system for visualization data, or at least one visualization specific parameter. Each of the one or more tokens may correspond to an enterprise object model definition that may provide additional details regarding the value of the token. Additionally, or alternatively, each of the one or more tokens may have a predefined relationship with one or more external tokens of the plurality of external databases, where the annotation may be parsed for one or more tokens (e.g., parsing for a known set of enterprise model definitions for chart configurations and/or parsing for enterprise model definitions for data models). For example, the additional user may input the following free text: "The bar chart will be generated with x-axis displaying time plotted against strength shown on y-axis from medication file." The one or more tokens may include "x-axis," "strength," "y-axis," and "medication." In some embodiments, one or more APIs may be utilized to retrieve the tokens and derive the context from an incoming request from the APQR UI. Tokens may be mapped to some known definitions in the system, and Natural Language Processing (NLP) may be used to understand the context. For example, "x-axis" or "y-axis" in a sentence may be interpreted to imply that a chart may be expected to be generated, and using NLP, it may also be derived from the tokens which columns (e.g., "time" and/or "strength") may be needed. Also, using NLP, it may also be derived from which database table the "medication file" may need to be plotted in the corresponding chart.

In some embodiments, the method may include storing, by the one or more processors, the one or more tokens in the at least one database. In some embodiments, the database may already include the tokens with corresponding definitions. In some embodiments, the one or more tokens may be stored with a unique identifier that corresponds to the report.

In some embodiments, the method may include analyzing, by the one or more processors, the at least one user role corresponding to the at least one additional user to determine whether the at least one additional user has permission to modify the at least one of the one or more sections. For example, the configuration data may be analyzed to determine the specified user role for the one or more sections of the report. If the additional user does not have the same role as the specified user role, the user may not have permission to modify the one or more sections of the report. If the additional user does have the same role as the specified user role, the user may have permission to modify the one or more sections of the report.

The method may include transmitting, by the one or more processors, at least one search query to the at least one database, the at least one search query including at least one of the one or more tokens (Step 410). For example, the search query may be sent to the database to retrieve values corresponding to the one or more tokens. In some embodiments, the at least one database may transmit at least one external search query to the plurality of external databases. For example, upon receiving the search query, the database may transmit an external search query to the plurality of external databases. The external search query may be based on the search query. In some embodiments, the transmitting may be in response to determining that the at least one additional user has permission to modify the at least one of the one or more sections.

In some embodiments, the method may include extracting, by the one or more processors, the one or more tokens from the at least one search query. For example, the search query may be analyzed and parsed based on a list of potential tokens. The method may include extracting any tokens corresponding to the list of potential tokens. The method may further include mapping, by the one or more processors, the one or more tokens against one or more enterprise object model definitions. In some embodiments, some or all of the external databases may use token values that are similar to the token values to the database. For example, the database may have a token value of "medication," where an external database may have a token value of "drug." The external database's "medication" token may have an enterprise object model definition of "drug," where the database includes one or more relationships between the tokens stored in the database and similar tokens that are stored in the external databases. The method may further include, based on the mapping, retrieving, by the one or more processors, a context of the at least one search query. For example, a "medication" token of the database may be mapped to a "drug" token of an external database, where the context may be a value that corresponds to the "drug" token. The context may refer to interpreting the meaning of the tokens when such tokens are being extracted. For example, interpreting the meaning of the tokens may be based on the context of one or more sections of the report that pertain to the token. For example, asking to "plot" some graphs in a graph section of the report for a "Manufacturing" section may indicate pulling the corresponding tables/columns, as well as date and time ranges, configured for the "Manufacturing" section. Additionally, the same text in a "Security" section may indicate pulling the corresponding tables/columns, as well as date and time ranges, configured for the "Security" section. In some embodiments, such information may be configured beforehand. Additionally, for example, if a user "X" is logged in to the system, and the same text is input for user "X" and user "Y", specific content may be pulled for user "X" based on the role of user "X".

Additionally, or alternatively, the method may include generating, by the one or more processors, a configuration model based on the mapped one or more tokens. The method may further include displaying, by the one or more processors, the configuration model on the one or more user interfaces of a user device. The configuration model may indicate which sections of the report belong to specific users, which database connection end points/ports to use for which reports, which tables inside a specific database should be used for specific sections, and the like. Additionally, the configuration model may define specific visualizations, such as charts and tables that may be included in specific sections of the report. The configuration model may also define the x-axis, y-axis, and labels of the visualizations.

In some embodiments, the method may include, in response to determining that the at least one additional user does not have permission to modify the at least one visualization, displaying, by the one or more processors, an alert indicating that the at least one additional user does not have permission to modify the at least one visualization. For example, as discussed above, if the additional user does not have the same role as the specified user role, the user may not have permission to modify the one or more sections of the report. Additionally, upon such a determination, an alert may be displayed upon one or more user interfaces of one or more user devices. The alert may indicate that the at least one additional user may not have permission to modify the visualization.

The method may include, in response to transmitting the at least one search query, receiving, by the one or more processors, updated visualization data from the at least one database (Step 412). For example, the updated visualization data may include data that corresponds to the tokens. Additionally, for example, the updated visualization data may include data that was retrieved from the one or more external databases, based on the one or more tokens. The updated visualization data may include updated values for at least one of the one or more tokens. The database may receive updated visualization data in response to sending the external search query to the one or more external databases. The database may then transmit the updated visualization data to the source of the search query.

In some embodiments, the method may include generating, by the one or more processors, an updated visualization based on the at least one visualization and the updated visualization data. In some embodiments, the generating may include applying the updated visualization data to the updated visualization. For example, a bar chart may be updated based on updated x-axis data and/or y-axis data.

The method may include displaying, by the one or more processors, the updated visualization on one or more user interfaces of one or more user devices (Step 414). The displaying may include presenting the updated visualization on the one or more user interfaces, where the at least one additional user may provide further modifications to the at least one of the one or more sections.

Although FIG. 4 shows example blocks of exemplary method 400, in some implementations, the exemplary method 400 may include additional blocks, fewer blocks, different blocks, or differently arranged blocks than those depicted in FIG. 4 Additionally, or alternatively, two or more of the blocks of the exemplary method 400 may be performed in parallel.

Exemplary Device

Figure 5:
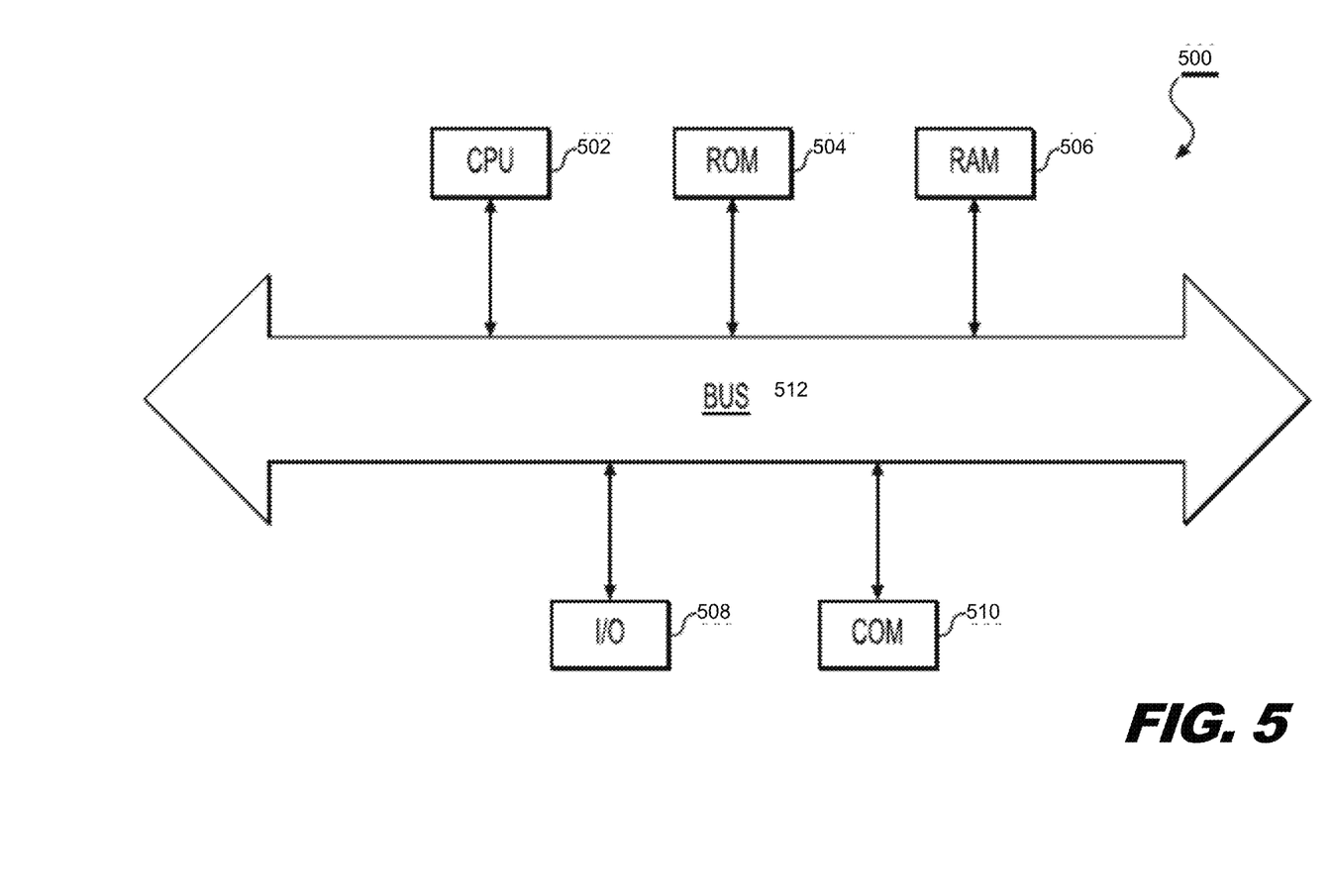
FIG. 5 depicts an example system that may execute techniques presented herein.

FIG. 5 is a simplified functional block diagram of a computer 500 that may be configured as a device for executing the methods of FIGS. 3-4, according to exemplary embodiments of the present disclosure. For example, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for dynamically modifying at least one visualization, the method comprising:
   receiving, by one or more processors, data from at least one database;
   receiving, by the one or more processors, configuration data from at least one user;
   based on the received data, generating, by the one or more processors, at least one report with one or more sections that corresponds to at least one user role, wherein the one or more sections comprises at least one visualization based on the received data and the configuration data;
   receiving, by the one or more processors, at least one annotation from at least one additional user, the at least one annotation including one or more tokens;

determining, by the one or more processors, whether the at least one additional user based on the at least one user role has permission to modify the one or more sections;

transmitting, by the one or more processors, at least one search query to the at least one database, the at least one search query including at least one of the one or more tokens if the at least one additional user has the permission to modify the one or more sections;

in response to transmitting the at least one search query, receiving, by the one or more processors, updated visualization data from the at least one database; and displaying, by the one or more processors, the updated visualization on one or more user interfaces of one or more user devices.

2. The computer-implemented method of claim 1, wherein at least one of the one or more tokens indicate information about a visualization type, a visualization time period, a system for visualization data, or at least one visualization specific.

3. The computer-implemented method of claim 1, the method further comprising:
storing, by the one or more processors, the one or more tokens in the at least one database.

4. The computer-implemented method of claim 1, the method further comprising:
extracting, by the one or more processors, the one or more tokens from the at least one search query;
mapping, by the one or more processors, the one or more tokens against one or more enterprise object model definitions, wherein the one or more enterprise object model definitions are one or more data objects stored in an external database; and
based on the mapping, retrieving, by the one or more processors, a context of the at least one search query.

5. The computer-implemented method of claim 4, the method further comprising:
generating, by the one or more processors, a configuration model based on the mapped one or more tokens; and
displaying, by the one or more processors, the configuration model on the one or more user interfaces of a user device.

6. The computer-implemented method of claim 1, wherein each of the one or more tokens correspond to an enterprise object model definition, and wherein the enterprise object model definition corresponds to one or more data objects stored in an external database.

7. The computer-implemented method of claim 1, wherein each of the one or more tokens has a predefined relationship with one or more external tokens of a plurality of external databases.

8. The computer-implemented method of claim 1, the method further comprising:
analyzing, by the one or more processors, the configuration data received by the at least one additional user to determine the at least one user role for the one or more sections of the report.

9. The computer-implemented method of claim 8, the method further comprising:
in response to determining that the at least one additional user does not have permission to modify the at least one visualization, displaying, by the one or more processors, an alert indicating that the at least one additional user does not have permission to modify the at least one visualization.

10. A computer system for dynamically modifying at least one visualization, the computer system comprising:

a memory having processor-readable instructions stored therein; and
one or more processors configured to access the memory and execute the processor-readable instructions, which when executed by the one or more processors configures the one or more processors to perform a plurality of functions, including functions for:
receiving data from at least one database;
receiving configuration data from at least one user;
based on the received data, generating at least one report with one or more sections that corresponds to at least one user role, wherein the one or more sections comprises at least one visualization based on the received data and the configuration data;
receiving at least one annotation from at least one additional user, the at least one annotation including one or more tokens;
determining, by the one or more processors, whether the at least one additional user based on the at least one user role has permission to modify the one or more sections;
transmitting at least one search query to at least one database, the at least one search query including at least one of the one or more tokens if the at least one additional user has the permission to modify the one or more sections;
in response to transmitting the at least one search query, receiving updated visualization data from the at least one database; and
displaying the updated visualization on one or more user interfaces of one or more user devices.

11. The computer system of claim 10, wherein at least one of the one or more tokens indicate information about a visualization type, a visualization time period, a system for visualization data, or at least one visualization specific.

12. The computer system of claim 10, the functions further comprising:
storing the one or more tokens in the at least one database.

13. The computer system of claim 10, the functions further comprising:
extracting the one or more tokens from the at least one search query;
mapping the one or more tokens against one or more enterprise object model definitions, wherein the one or more enterprise object model definitions are one or more data objects stored in an external database; and
based on the mapping, retrieving a context of the at least one search query.

14. The computer system of claim 13, the functions further comprising:
generating a configuration model based on the mapped one or more tokens; and
displaying the configuration model on the one or more user interfaces of a user device.

15. The computer system of claim 10, wherein each of the one or more tokens correspond to an enterprise object model definition.

16. The computer system of claim 10, wherein each of the one or more tokens has a predefined relationship with one or more external tokens of a plurality of external databases.

17. The computer system of claim 10, the functions further comprising:
analyzing at least one user role corresponding to the at least one additional user to determine whether the at least one additional user has permission to modify the at least one visualization.

18. A non-transitory computer-readable medium containing instructions for dynamically modifying at least one visualization, the instructions comprising:
- receiving data from at least one database;
- receiving configuration data from at least one user;
- based on the received data, generating at least one report with one or more sections that corresponds to at least one user role, wherein the one or more sections comprises at least one visualization based on the received data and the configuration data;
- receiving at least one annotation from at least one additional user, the at least one annotation including one or more tokens;
- determining, by the one or more processors, whether the at least one additional user based on the at least one user role has permission to modify the one or more sections;
- transmitting at least one search query to at least one database, the at least one search query including at least one of the one or more tokens if the at least one additional user has the permission to modify the one or more sections;
- in response to transmitting the at least one search query, receiving updated visualization data from the at least one database; and
- displaying the updated visualization on one or more user interfaces of one or more user devices.

19. The non-transitory computer-readable medium of claim 18, the instructions further comprising:
- storing the one or more tokens in the at least one database.

20. The non-transitory computer-readable medium of claim 18, wherein at least one of the one or more tokens indicate information about a visualization type, a visualization time period, a system for visualization data, or at least one visualization specific.

* * * * *